(12) United States Patent
Tsao et al.

(10) Patent No.: US 6,862,274 B1
(45) Date of Patent: Mar. 1, 2005

(54) METHOD AND SYSTEM CAPABLE OF PROVIDING MOBILITY SUPPORT FOR IPV4/IPV6 INTER-NETWORKING

(75) Inventors: Shiao-Li Tsao, Hsinchu (TW); Jen-Chi Liu, Hsinchu (TW); Mu-Liang Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 808 days.

(21) Appl. No.: 09/696,292

(22) Filed: Oct. 26, 2000

(51) Int. Cl.[7] ................ H04L 12/28; H04L 12/66; H04Q 7/00

(52) U.S. Cl. .............. 370/338; 370/349; 370/395.52; 370/401; 370/466

(58) Field of Search ............... 370/401, 465–473, 370/395.52, 395.6–395.65, 328, 329, 338, 349, 352, 389, 395.1, 466, 467, 469

(56) References Cited

U.S. PATENT DOCUMENTS

| | | | | |
|---|---|---|---|---|
| 6,038,233 A | * | 3/2000 | Hamamoto et al. | 370/401 |
| 6,118,784 A | * | 9/2000 | Tsuchiya et al. | 370/401 |
| 6,535,493 B1 | * | 3/2003 | Lee et al. | 370/329 |
| 6,580,717 B1 | * | 6/2003 | Higuchi et al. | 370/401 |
| 6,625,135 B1 | * | 9/2003 | Johnson et al. | 370/332 |

* cited by examiner

*Primary Examiner*—Alpus H. Hsu
(74) *Attorney, Agent, or Firm*—Bacon & Thomas, PLLC

(57) ABSTRACT

A method and system capable of providing mobility support for IPv4/IPv6 inter-networking to a mobile node is disclosed. The mobile node in the system has an address mapper, an IPv4 protocol stack and an IPv6 protocol stack in the network layer. When moving from IPv4 to IPv6 networks, the mobile node registered an IPv4 address receives router advertisement packets from an IPv6 router, so as to obtain a IPv6 care-of-address, and resolve the IPv6 care-of-address by an IPv4 care-of-address. The address mapper issues an IPv4 message to register the IPv4 care-of-address. When moving from IPv6 to IPv4 networks, the mobile node registered an IPv6 address receives agent advertisement messages from a foreign agent, so as to obtain an IPv4 care-of-address, resolve the IPv4 care-of-address by an IPv6 care-of-address. The address mapper issues an IPv6 message to register and update binding information by the IPv6 care-of-address.

13 Claims, 7 Drawing Sheets

METHOD AND SYSTEM CAPABLE OF PROVIDING MOBILITY SUPPORT FOR IPV4/IPV6 INTER-NETWORKING

BACKGROUND OF THE INVENTION

1. Field of the Invention

The present invention pertains to providing mobility support for inter-networking. More particularly, the present invention relates to a method and system capable of providing mobility support for IPv4/IPv6 inter-networking based on a dual-stack architecture.

2. Description of Related Art

Advances in mobile and communication techniques make the rapid growth of the usage of mobile computers, so that the demand on mobility support of network protocols becomes intensive. Network protocol such as Internet Protocol (IP) is designed to provide packet addressing and routing functions. In order to support the mobility, some extensions on network protocols are proposed. However, there may be more than one network protocol existing, which makes the roaming in the networks with different network protocols difficult.

Mobile Internet Protocol (Mobile IP) provides mobility services for a moving node on the Internet. It aims to solve addressing and packet routing problems while the mobile station changes its point of attachment but still wants to communicate with other hosts by its original address. For a mobile station moved to a new network, the packets to the original address will not be routed to the new network since the new network has a different network prefix as its home network. To solve this problem, Mobile IP is proposed. Mobile IP version 4 (Mobile IPv4) is designed for Internet Protocol version 4 (IPv4). FIG. 6 schematically illustrates the inter-networking operation for the Mobile IPv4. In general, mobility agents advertise their presence by agent advertisement messages. A mobile node 91 receives these agent advertisements and determines whether it is on its home network 92 or a foreign network 93. When the mobile node 91 detects that it is located on its home network 91, it operates without mobility services. On the other hand, mobile node 91 obtains a care-of-address from a foreign agent 97 while it detects that it has moved to a foreign network 93. The mobile node 91 operating away from home then registers its new care-of-address with its home agent 94. Then data packets 95 sent to the mobile node's home address are intercepted by its home agent 94, tunneled by the home agent 94 to the mobile node's care-of-address, received at the tunnel endpoint. In the reverse direction, data packets sent by the mobile node 91 are generally delivered to their destination using standard Internet Protocol (IP) routing mechanisms.

As to Internet Protocol version 6 (IPv6), the next generation Internet Protocol, it has already taken mobility issues into consideration. Mobile IP version 6 (Mobile IPv6) further enhances mobility functions in IPv6. Mobile IPv6 shares many ideas in the Mobile IPv4 and inherits some new features in IPv6. With reference to FIG. 7, the basic operations of Mobile IPv6 are illustrated. With Mobile IPv6, a mobile node 91 is always addressable by its home address, and packets 95 addressed to its home address are routed to it using conventional Internet routing mechanisms. While away from home, a mobile node 91 detects of such by receiving a router advertisement form an IPv6 router 96. The mobile node 91 registers one of its care-of addresses with the router 96 on its home link, and requests this router 96 to function as the "home agent" for the mobile node 91. The mobile node's home agent 94 thereafter uses proxy neighbor discovery to intercept any IPv6 packets 95 addressed to the mobile node's home address on the home link, and tunnels each intercepted packet to the mobile node's primary care-of-address. The binding update and binding acknowledgement destination options, together with a "Binding Request" destination option, are used to allow IPv6 nodes communicating with a mobile node, to dynamically learn and cache the mobile node's binding. When a mobile node 91 sends a packet while away from home, it sets the source address in the packet's IPv6 header to one of its current care-of addresses, and includes a "Home Address" destination option in the packet, giving the mobile node's home address.

The transition of two different addressing protocols such as IPv4 to IPv6 is a very important issue. Several transition techniques are proposed to transmit IPv4 packets in an IPv6 network or vice versa. However, the transition problems involving in Mobile IP are almost ignored, so that it is difficult to support the mobility in heterogeneous networks. For example, concerning a situation that a mobile IPv4 node moves to an IPv6 network, since IPv6 eliminates the concept of foreign agents, the node can not receive the agent advertisement message and fails to register its care-of-address to the home again. On the other hand, concerning the situation for a mobile node with IPv6 address migrating to an IPv4 network, the node can not receive IPv6 router advertisement, and also fails in the care-of-address registration.

Therefore, it is desirable to provide an improved method and system for providing inter-networking mobility support, so as to mitigate and/or obviate the aforementioned problems.

SUMMARY OF THE INVENTION

The object of the present invention is to provide a method and system capable of providing mobility support for IPv4/IPv6 inter-networking.

According to one aspect, the present invention which achieves the object relates to a system for providing IPv4 and IPv6 inter-networking mobility support. The system includes an IPv4 network and an IPv6 network, and a mobile node in the system has an address mapper, an IPv4 protocol stack and an IPv6 protocol stack in the network layer. When moving from IPv4 to IPv6 networks, the mobile node registered an IPv4 address receives router advertisement packets from an IPv6 router via the IPv6 protocol stack, so as to obtain an IPv6 care-of-address, resolve the IPv6 care-of-address by an IPv4 care-of-address, and obtain an IPv6 address mapping to a home agent of the mobile node. The address mapper issues an IPv4 message to register the IPv4 care-of-address to the home agent, and makes an association between original registered IPv4 address and the IPv4 care-of-address. When moving from IPv6 to IPv4 networks, the mobile node registered an IPv6 address receives agent advertisement messages from a foreign agent via the IPv4 protocol stack, so as to obtain an IPv4 care-of-address, resolve the IPv4 care-of-address by an IPv6 care-of-address, and obtain the new IPv4 address for a home agent of the mobile node. The address mapper issues an IPv6 message to register and update binding information by the IPv6 care-of-address to the home agent, and makes an association between original registered IPv6 address and the IPv6 care-of-address.

According to another aspect, the present invention which achieves the object relates to a method of providing mobility support for a mobile node moving from IPv4 to IPv6 networks. The mobile node has an address mapper, an IPv4 protocol stack and an IPv6 protocol stack in the network layer. The mobile node registered an IPv4 address first receives router advertisement packets from an IPv6 router via the IPv6 protocol stack. Next, the mobile node obtains an IPv6 care-of-address, resolves the IPv6 care-of-address by an IPv4 care-of-address, and obtains an IPv6 address mapping to a home agent of the mobile node. Then, the address mapper issues an IPv4 message to register the IPv4 care-of-address to the home agent, and makes an association between original IPv4 address and the IPv4 care-of-address, such that data packets can be transmitted to the mobile node by the IPv4 care-of-address, translated to IPv6 care-of-address by IPv4/IPv6 translator, and then delivered to the mobile node.

According to a further aspect, the present invention which achieves the object relates to a method of providing mobility support for a mobile node moving from IPv6 to IPv4 networks. The mobile node has an address mapper, an IPv4 protocol stack and an IPv6 protocol stack in the network layer. The mobile node registered an IPv6 address first receives agent advertisement messages from a foreign agent via the IPv4 protocol stack. Next, the mobile node obtains an IPv4 care-of-address, resolves the IPv4 care-of-address by an IPv6 care-of-address, and obtains the IPv4 address for a home agent of the mobile node. Then, the address mapper issues an IPv6 message to register and update binding information by the IPv6 care-of-address to the home agent, and makes an association between original registered IPv6 address and the IPv6 care-of-address, such that data packets can be transmitted to the mobile node by IPv6 care-of-address, translated to IPv4 care-of-address by IPv4/IPv6 translator, and then delivered to the mobile node.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
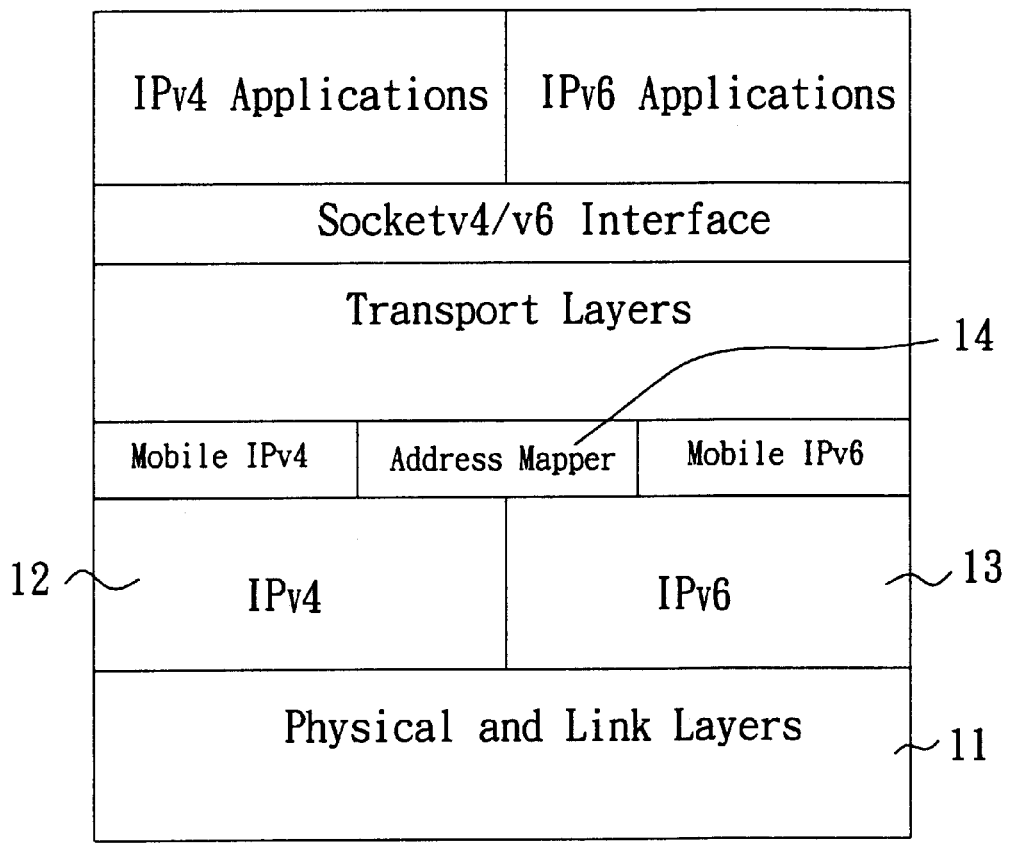
FIG. 1 schematically illustrates the protocol stack structure of the mobile node in accordance with the present invention.

To provide mobility support for IPv4 and IPv6 inter-networking, the system and method in accordance with the present invention extend some layers in a protocol stack, which processes another network addressing protocol. Moreover, a new address mapper layer is provided to associate two addresses together on the mobile node. The other network devices and protocol stacks in networks remain unchanged. The extended protocol stack on mobile nodes is shown in FIG. 1.

As shown, the bottom two layers, i.e., the physical and link layers 11, remain unchanged. On top of the physical and link layers 11, two network layer protocol stacks, including IPv4 protocol stack 12 and IPv6 protocol stack 13, are provided to process packets from/to the correspondent nodes in different networks. Each protocol stack 12 or 13 provides its own mobility support, denoted by mobile IPv4 or mobile IPv6 in the protocol stack. The address mapper 14 makes an association of the two addresses. The packets carried by different addressing protocol are merged together and the stack provides transparent services to upper layer applications, including the transport layer and application layer.

Figure 2:
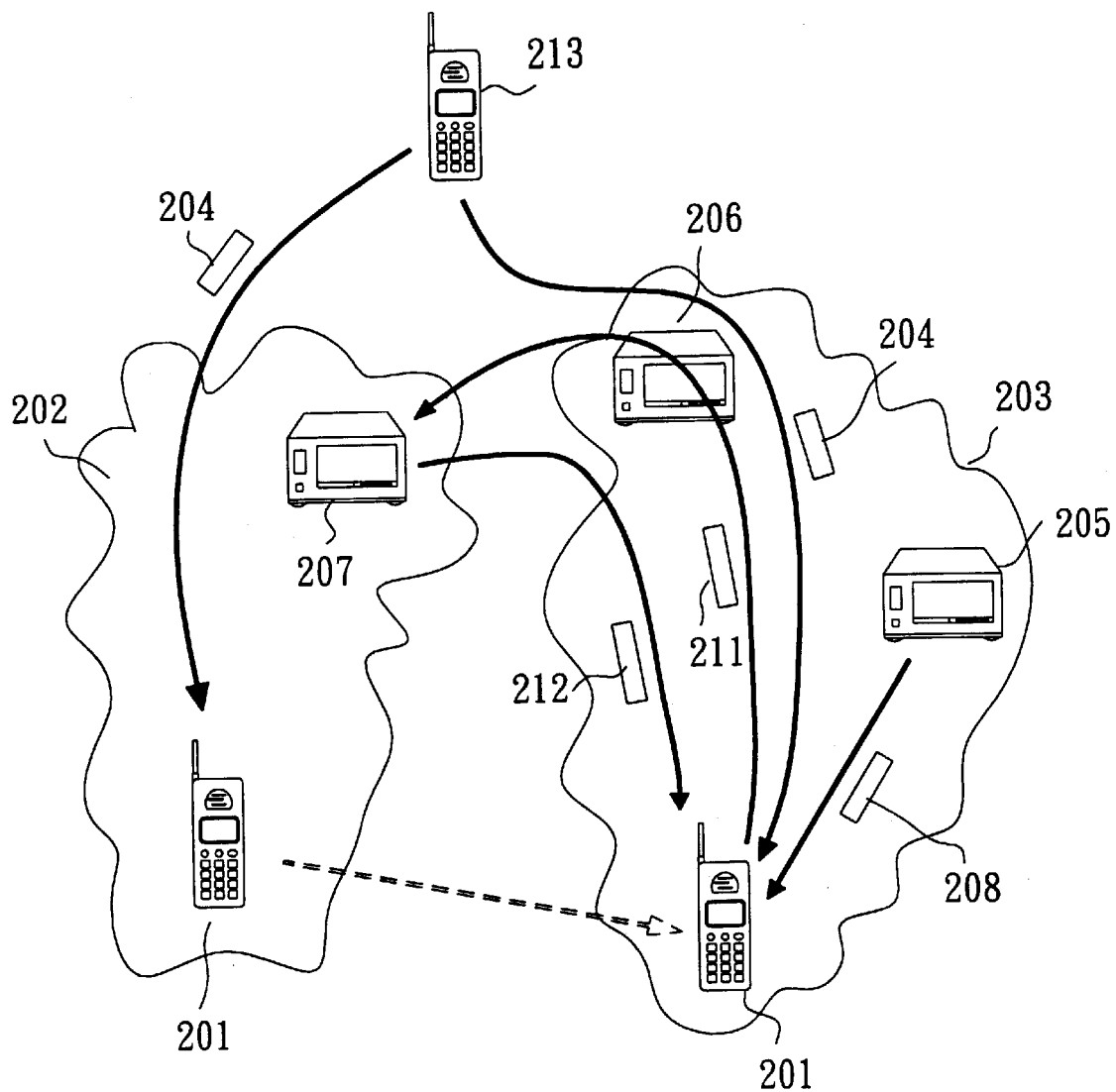
FIG. 2 schematically illustrates the system architecture for providing inter-networking mobility support to a mobile node registered an IPv4 address moving to an IPv6 network.
Figure 3:
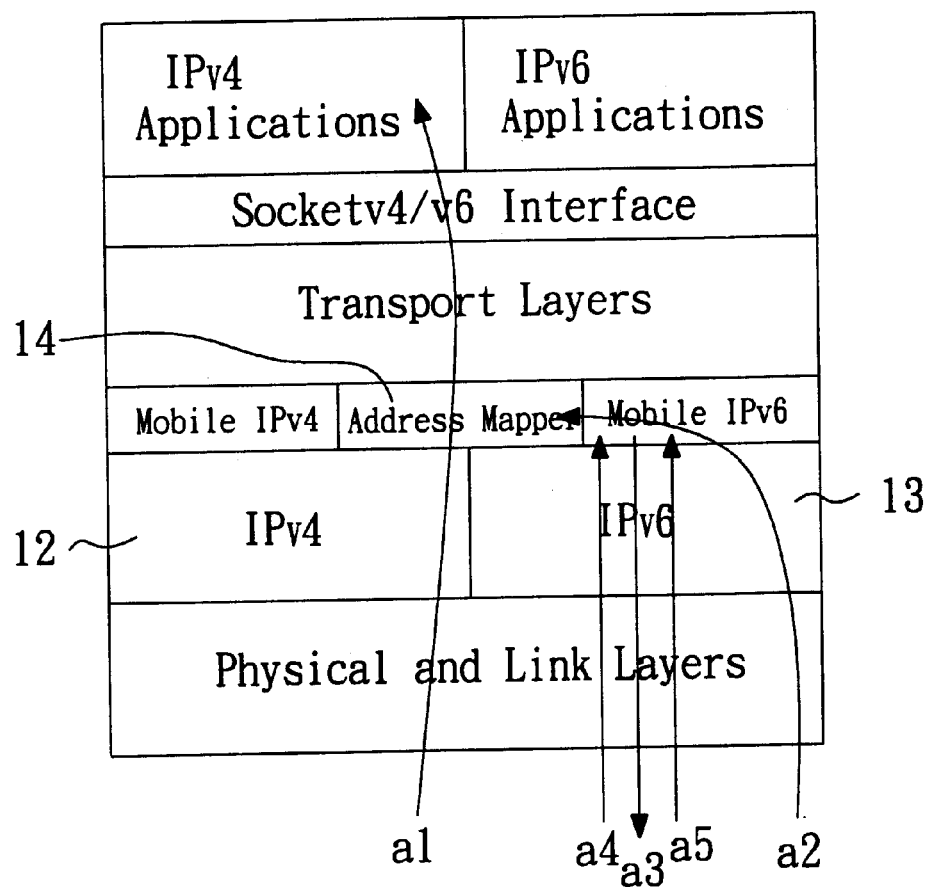
FIG. 3 shows the data flow in the protocol stack corresponding to FIG. 2.

Concerning the situation that a mobile node registered an IPv4 address moving to an IPv6 network, FIGS. 2 and 3 illustrate the system architecture for providing inter-networking mobility support and the corresponding data flow in the protocol stack, respectively. As shown, the mobile node 201 registered an IPv4 address can receive and transmit data packets 204 in its original IPv4 network 202, as indicated by the arrow line a1. While it moves to a visited IPv6 network 203, it can receive router advertisement packets 208 from the IPv6 router 205, as indicated by the arrow line a2, via its own IPv6 protocol stack 13. The address mapper 14 intercepts the router advertisement packets 208 and detects that the mobile node 201 moves to an IPv6 network 203. The address mapper 14 generates its IPv6 care-of-address by using the sub-net prefix of the visited network 203. After the mobile node 201 obtains an IPv6 address, it resolves the IPv6 address by IPv4 address and also obtains the IPv6 address mapping to its home agent 207. The mapping between IPv6 and IPv4 addresses can be found in an IPv6 domain name server or via an address translator. The generation of the IPv6 address and the mapping of IPv4 and IPv6 addresses are known to those skilled in the art, and a detail description is deemed unnecessary.

The address mapper 14 then constructs a mobile IPv4 registration request message 211 and transmits it to its home agent 20 through the IPv6 network 203, as indicated by the arrow line a3, to register the IPv4 care-of-address to the home agent 207. The address mapper 14 also makes an association between the original registered IPv4 address and the IPv6 care-of-address. The network address translation is assumed to be performed by a network translator 206 or other similar mechanisms provided by the network. The home agent 207 receives the registration request message 211 and updates its care-of-address, and then responses a registration reply message 212 to the mobile node 201, as indicated by the arrow line a4. The care-of-address has to be a co-located address allocated by the visited network 203 or the network translator 206. Therefore, data packets 204 to the mobile node 21 from a correspondent node 213 can be transmitted to the mobile node 201 with the new care-of-address directly, as indicated by the arrow line a5, and mobility support can be achieved for IPv4/IPv6 inter-networking.

Figure 4:
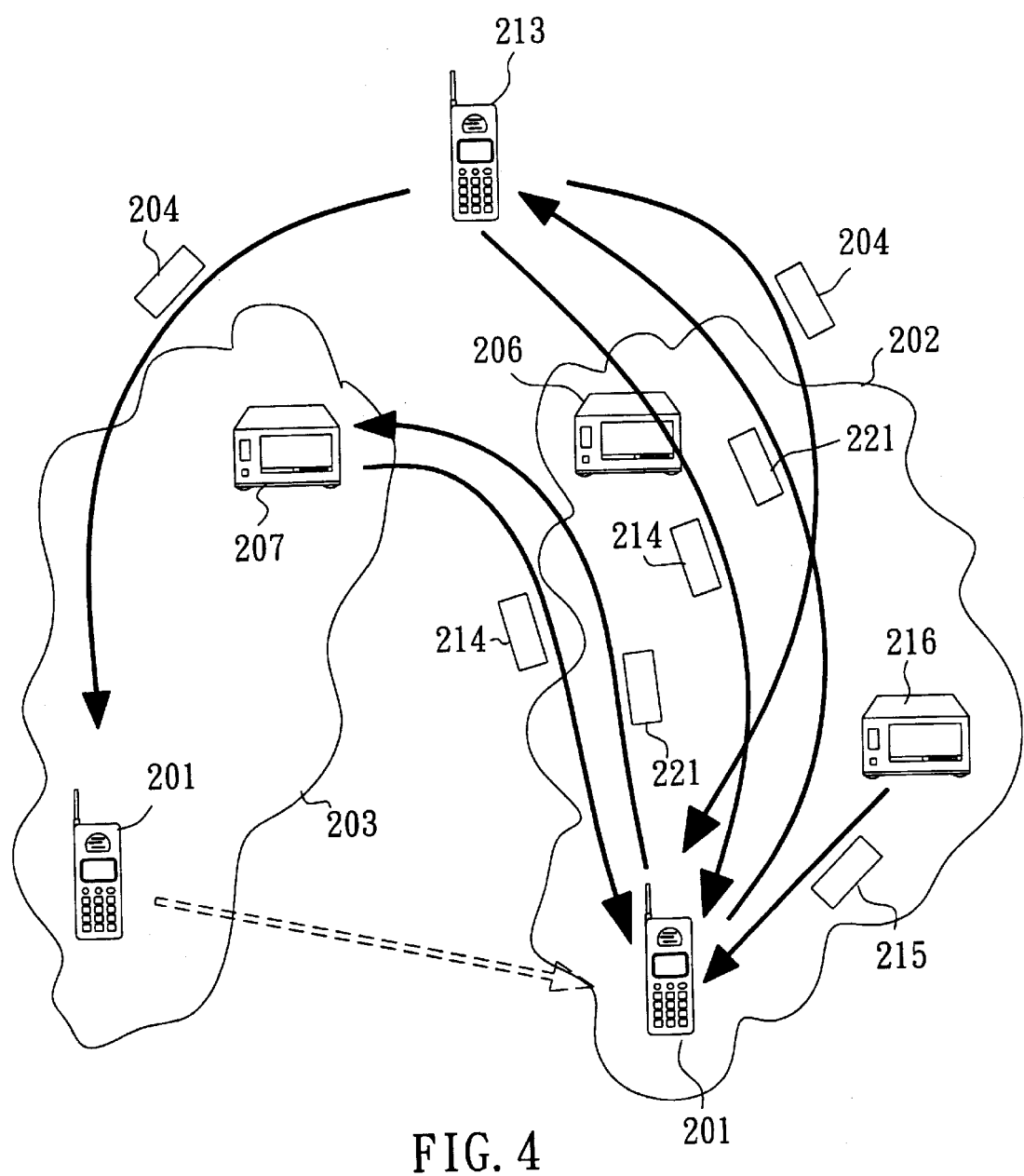
FIG. 4 schematically illustrates the system architecture for providing inter-networking mobility support to a mobile node registered an IPv6 address moving to an IPv4 network.
Figure 5:
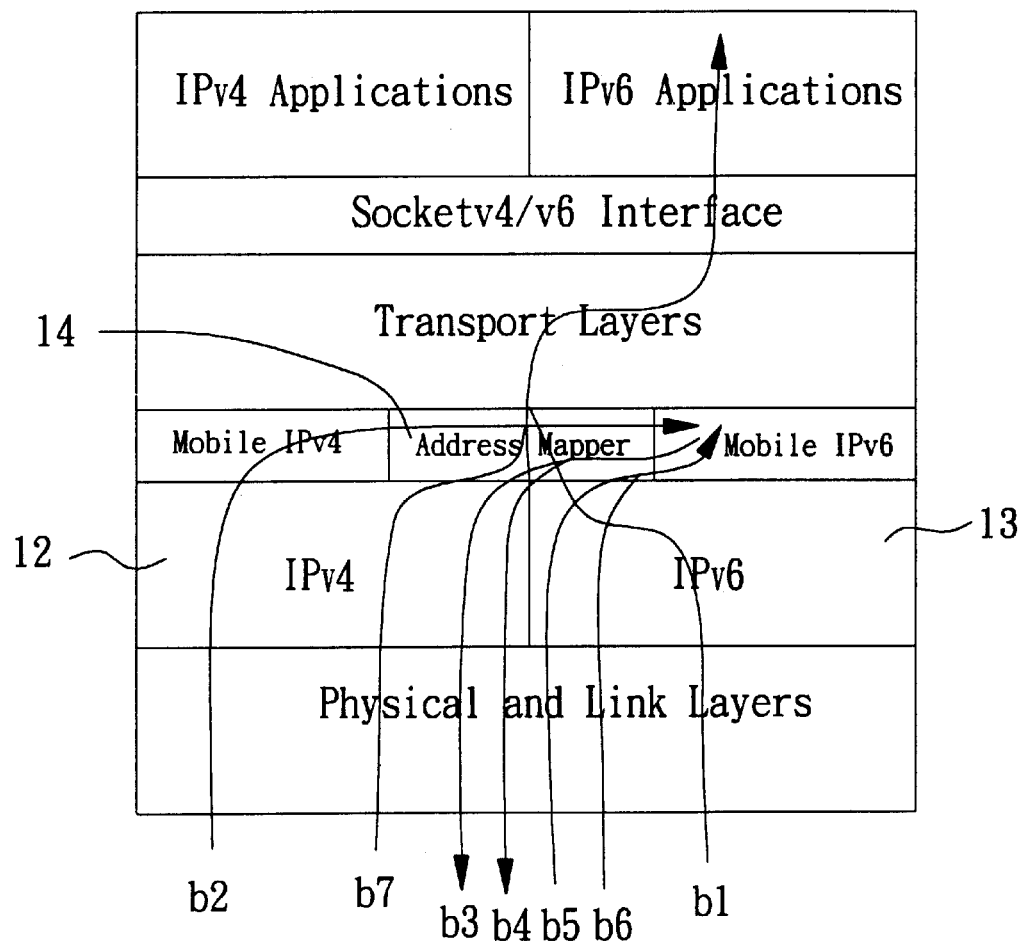
FIG. 5 shows the data flow in the protocol stack corresponding to FIG. 4.
Figure 6:
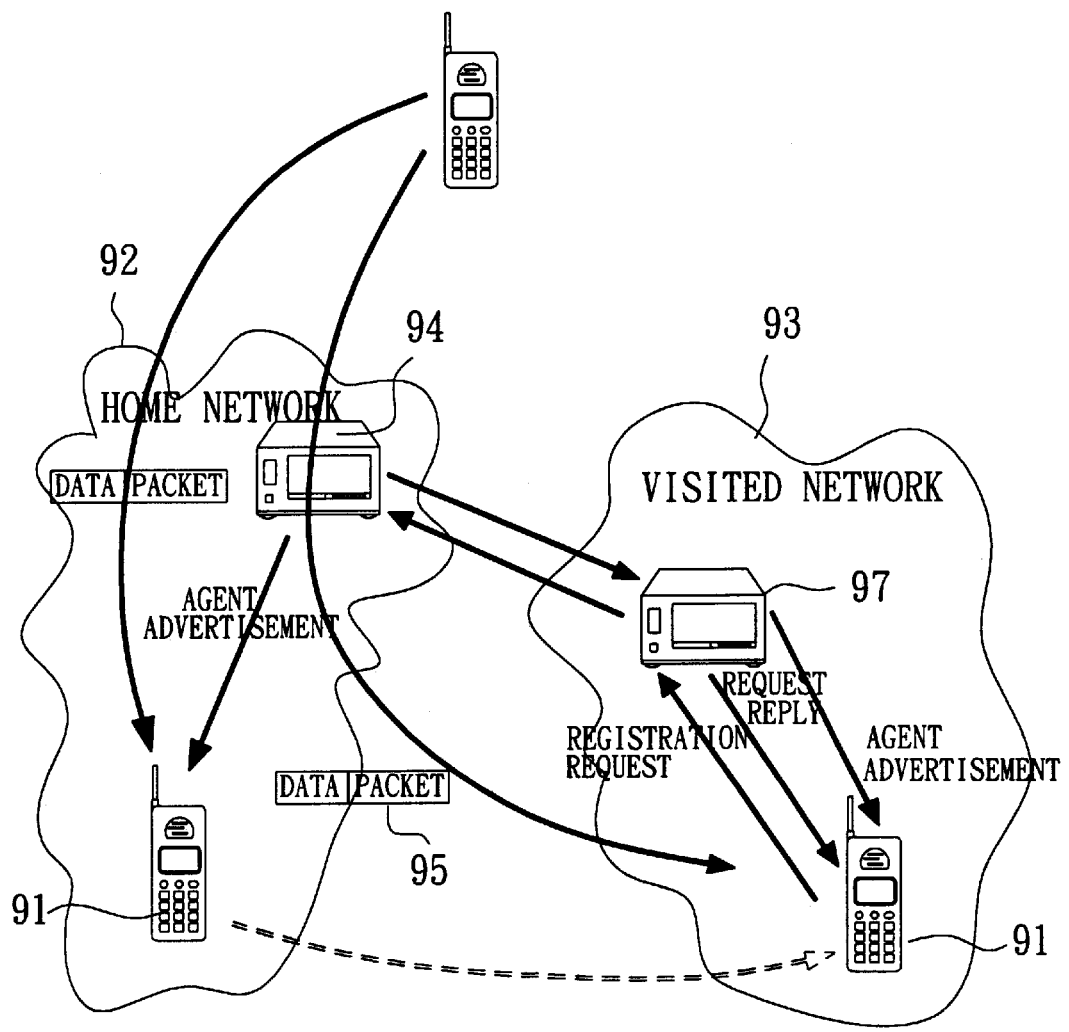
FIG. 6 schematically illustrates the inter-networking operation for the Mobile IPv4.
Figure 7:
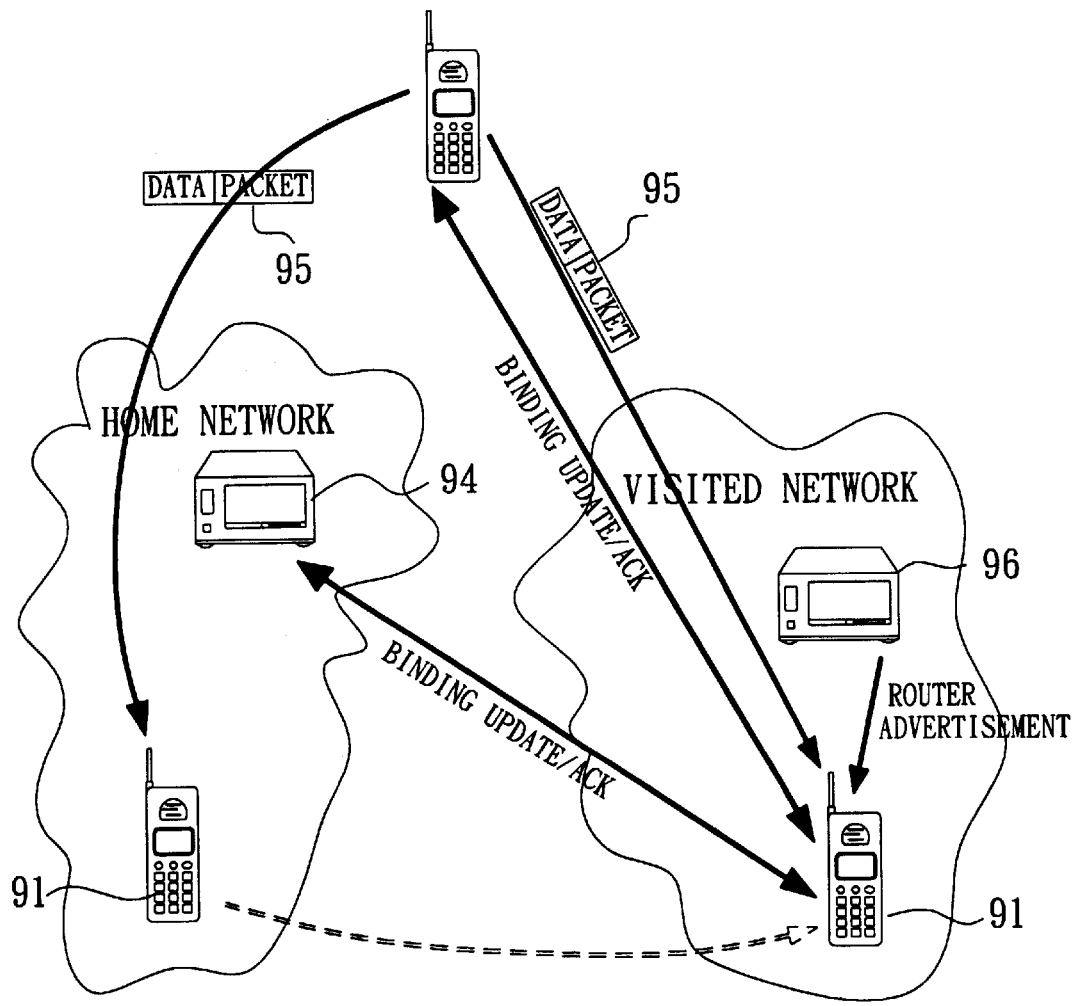
FIG. 7 schematically illustrates the inter-networking operation for the Mobile IPv6.

Concerning another situation that a mobile node registered an IPv6 address moving to an IPv4 network, FIGS. 4 and 5 illustrate the system architecture for providing inter-networking mobility support and the corresponding data flow in the protocol stack, respectively. As shown, the mobile node 201 can receive and transmit data packets 204 in its original IPv6 network 203, as indicated by the arrow line b1. While it moves to a visited IPv4 network 202, it can receive foreign agent advertisement messages 215 from a foreign agent 216 by its IPv4 protocol 12 stack, as indicated by the arrow line b2. The address mapper 14 detects that the mobile node 201 has moved to a network 202 with different address protocol. The address mapper 14 asked a co-located care-of-address via the IPv4 protocol stack 12. After it obtains a new care-of-address, it resolves the IPv4 address by an IPv6 address and also obtains the IPv4 address of the Home agent 207 in the IPv6 network 203. The care-of-address can be obtained by DHCP or some other dynamic address allocation technique. The address mapping can be solved by DNS. These two issues are known to those skilled in the art. Once the address mapper 14 resolves the addresses, it generates an IPv6 binding message 221 to the home agent 207 and correspondent node 213, as indicated by the arrow lines b3 and b4. The messages 221 are used to register the IPv6 care-of-address in the home agent 207 and the correspondent node 213, and update binding information. The address mapper 14 also makes an association between the original registered IPv6 address and the IPv4 care-of-address. After registration, the home agent 207 and the correspondent node 213 reply binding acknowledge messages 214 to the mobile node 201, as indicated by the arrow lines b5 and b6. Accordingly, data packets 204 from a correspondent node 213 can be transferred by the new care-of-address via the network translator 206, as indicated by the arrow line b7. Therefore, mobility support can be achieved for IPv4/IPv6 inter-networking Although the present invention has been explained in relation to its preferred embodiment, it is to be understood that many other possible modifications and variations can be made without departing from the spirit and scope of the invention as hereinafter claimed.

What is claimed is:

1. A system for providing IPv4 and IPv6 inter-networking mobility support, comprising:
   a mobile node having an address mapper, an IPv4 protocol stack and an IPv6 protocol stack in a network layer thereof;
   an IPv4 network and an IPv6 network;
   wherein, when moving from IPv4 to IPv6 networks, the mobile node registered an IPv4 address receives router advertisement packets from an IPv6 router via the IPv6 protocol stack, so as to obtain an IPv6 care-of-address, resolve the IPv6 care-of-address by an IPv4 care-of-address, and obtain an IPv6 address mapping to a home agent of the mobile node, and the address mapper issues an IPv4 message to register the IPv4 care-of-address to the home agent, and makes an association between original registered IPv4 address and the IPv6 care-of-address on the mobile node; and
   wherein, when moving from IPv6 to IPv4 networks, the mobile node registered an IPv6 address receives agent advertisement messages from a foreign agent via the IPv4 protocol stack, so as to obtain an IPv4 care-of-address, resolve the IPv4 care-of-address by an IPv6 care-of-address, and obtain the new IPv4 address for a home agent of the mobile node, and the address mapper issues an IPv6 message to register and update binding information by the IPv6 care-of-address to the home agent, and makes an association between original registered IPv6 address and the IPv4 care-of-address on the mobile node.

2. The system as claimed in claim 1, wherein, when the mobile node moves from the IPv4 to the IPv6 networks, the IPv6 care-of-address is generated from the address mapper by using a sub-net prefix of the IPv6 network.

3. The system as claimed in claim 2, wherein, the home agent responses a reply message to the mobile node after receiving the IPv4 message.

4. The system as claimed in claim 3, wherein, the IPv6 care-of-address is a co-located address allocated by the IPv6 network.

5. The system as claimed in claim 1, wherein, when the mobile node moves from IPv6 to IPv4 networks, the IPv4 care-of-address is generated from the address mapper by asking a co-located care-of-address via the IPv4 stack.

6. The system as claimed in claim 5, wherein, the home agent responses a reply message to the mobile node after receiving the IPv6 message.

7. A method of providing mobility support for a mobile node moving from IPv4 to IPv6 networks, the mobile node having an address mapper, an IPv4 protocol stack and an IPv6 protocol stack in a network layer thereof, the method comprising the steps of:
   (A) the mobile node registered an IPv4 address receiving router advertisement packets from an IPv6 router via the IPv6 protocol stack;
   (B) the mobile node obtaining an IPv6 care-of-address, resolving the IPv6 care-of-address by an IPv4 care-of-address, and obtaining an IPv6 address mapping to a home agent of the mobile node; and
   (C) the address mapper issuing an IPv4 message to register the IPv4 care-of-address to the home agent, and making an association between original IPv4 address and the IPv6 care-of-address on the mobile node, such that data packets can be transmitted to the mobile node by the IPv4 care-of-address, translated to IPv6 care-of-address by IPv4/IPv6 translator, and then delivered to the mobile node.

8. The method as claimed in claim 7, wherein, in step (B), the IPv6 care-of-address is generated from the address mapper by using a sub-net prefix of the IPv6 network.

9. The method as claimed in claim 7, wherein, in step (C), the home agent responses a reply message to the mobile node after receiving the IPv4 message.

10. The method as claimed in claim 7, wherein, in step (C), the IPv6 care-of-address is a co-located address allocated by the IPv6 network.

11. A method of providing mobility support for a mobile node moving from IPv6 to IPv4 networks, the mobile node having an address mapper, an IPv4 protocol stack and an IPv6 protocol stack in a network layer thereof, the method comprising the steps of:
   (A) the mobile node registered an IPv6 address receiving agent advertisement messages from a foreign agent via the IPv4 protocol stack;
   (B) the mobile node obtaining an IPv4 care-of-address, resolving the IPv4 care-of-address by an IPv6 care-of-address, and obtaining the IPv4 address for a home agent of the mobile node; and
   (C) the address mapper issuing an IPv6 message to register and update binding information by the IPv6 care-of-address to the home agent, and making an association between original registered IPv6 address and the IPv4 care-of-address on the mobile node, such that data packets can be transmitted to the mobile node by IPv6 care-of-address, translated to IPv4 care-of-address by IPv4/IPv6 translator, and then delivered to the mobile node.

12. The method as claimed in claim 11, wherein, in step (B), the IPv4 care-of-address is generated from the address mapper by asking a co-located care-of-address via the IPv4 stack.

13. The method as claimed in claim 11, wherein, in step (C), the home agent responses a reply message to the mobile node after receiving the IPv6 message.

* * * * *